United States Patent
Kung et al.

(10) Patent No.: US 9,305,452 B2
(45) Date of Patent: Apr. 5, 2016

(54) BATTERY OVER-CHARGE AND OVER-DISCHARGE PROTECTION SYSTEM AND BATTERY PROTECTION METHOD ABLE TO RELEASE A PROTECTION STATE

(71) Applicant: Quanta Computer Inc., Taoyuan Shien (TW)

(72) Inventors: Hsiang-Sheng Kung, Taoyuan County (TW); Wei-Ting Yen, Taipei (TW); Pi-Chi Chen, New Taipei (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 0 days.

(21) Appl. No.: 14/458,629

(22) Filed: Aug. 13, 2014

(65) Prior Publication Data
US 2015/0339909 A1  Nov. 26, 2015

(30) Foreign Application Priority Data

May 21, 2014  (TW) .............................. 103117780 A

(51) Int. Cl.
G08B 21/00  (2006.01)
G08B 21/18  (2006.01)
G08B 5/36  (2006.01)

(52) U.S. Cl.
CPC ............... *G08B 21/185* (2013.01); *G08B 5/36* (2013.01)

(58) Field of Classification Search
CPC .................................................. G08B 21/185
USPC ............. 340/636.1–636.2; 320/134, 128, 136
See application file for complete search history.

(56) References Cited

U.S. PATENT DOCUMENTS

| | | | | |
|---|---|---|---|---|
| 4,231,026 A | * | 10/1980 | Sullivan ............. | G01R 31/3665 320/136 |
| 2010/0277326 A1 | * | 11/2010 | Berk ................... | G06F 11/3013 340/636.11 |
| 2013/0099755 A1 | * | 4/2013 | Lei ........................... | H02H 7/18 320/134 |

FOREIGN PATENT DOCUMENTS

| | | |
|---|---|---|
| CN | 103746148 A | 4/2014 |
| TW | 200634526 A | 10/2006 |
| TW | 201329682 A | 7/2013 |

OTHER PUBLICATIONS

"Application of HT46RB50 in USB Charge", HA0133T, Jul. 13, 2007 (http://www.holtek.com.tw/chinese/tech/appnote/uc/pdf/ha0133t.pdf), partial translation.

* cited by examiner

*Primary Examiner* — Jeffery Hofsass
(74) *Attorney, Agent, or Firm* — Rabin & Berdo, P.C.

(57) ABSTRACT

A battery protection system applicable to an electronic device includes a battery, a control module, a message generating module and an input interface. The control module is electrically connected to the battery for detecting if the battery is in an abnormal state. The message generating module is electrically connected to the control module for generating a battery-error warning message when the control module detects that the battery is in the abnormal state. The input interface is electrically connected to the control module for transmitting a user command to the control module after the battery-error warning message is generated, thereby enabling the control module to release the abnormal state of the battery according to the user command. A battery protection method is also provided.

13 Claims, 5 Drawing Sheets

BATTERY OVER-CHARGE AND OVER-DISCHARGE PROTECTION SYSTEM AND BATTERY PROTECTION METHOD ABLE TO RELEASE A PROTECTION STATE

RELATED APPLICATIONS

This application claims priority to Taiwan Application Serial Number 103117780, filed May 21, 2014, the entirety of which is herein incorporated by reference.

BACKGROUND

1. Technical Field

The present disclosure relates to a battery protection system. More particularly, the present disclosure relates to a battery protection system and a battery protection method for quickly releasing battery protection states.

2. Description of Related Art

With the increasing popularity of electronic devices, the applications of batteries (especially rechargeable batteries) are daily increased. In a conventional electronic device, a user generally has to unplug a battery or an adapter of the electronic device to release over-charge/over-discharge protection of a battery module. However, more and more electronic devices are now implemented with built-in and non-pluggable batteries. Under this circumstance, the user has to unplug the power adapter if he/she wants to release the battery protection, thus causing user disturbance, especially when the user does not carry the power adaptor when being out of home, the electronic device may not be able to be used.

To resolve the abovementioned problems, some existing electronic devices are implemented with a scheme of automatically releasing battery protections. However, the scheme of automatically releasing battery protections may be dangerous for the battery used in the electronic device if the factors invoking the battery protections are not removed. Therefore, it is very important to design a system which can release battery protections in a convenient and safe manner.

SUMMARY

In one aspect, the present disclosure is related to a battery protection system applicable to an electronic device. The battery protection system includes a battery, a control module, a message generating module and an input interface. The control module is electrically connected to the battery. The control module is configured for detecting if the battery is in an abnormal state. The message generating module is electrically connected to the control module. The message generating module is configured for generating a battery-error warning message when the control module detects that the battery is in the abnormal state. The input interface is electrically connected to the control module. The input interface is configured for transmitting a user command to the control module after the battery-error warning message is generated, thereby enabling the control module to release the abnormal state of the battery according to the user command.

In another aspect, the present disclosure is related to a battery protection method. The battery protection method includes the following steps: detecting if a battery is in an abnormal state; generating a battery-error warning message when the battery is detected to be in the abnormal state; and after the battery-error warning message is generated, releasing the abnormal state of the battery according to a user command sent from an input interface.

An advantage of applying the present disclosure is that, the user can release the abnormal states of a battery simply by utilizing an input interface to generate a user command. The user does not need to unplug the battery or the adapter of the electronic device. Furthermore, by detecting the abnormal states of the battery and generating battery-error warning messages to inform the user to perform corresponding operations, the factors invoking battery protections can be removed (for example, when the battery of a laptop is detected to be in an over-discharge protection state, the user is reminded to deactivate some of the applications to reduce the discharge current of the battery), thus promoting the safety of the battery working on the electronic device. Moreover, in the battery protection system provided by the present disclosure, the input interface configured for transmitting the user command can be integrated with the original input interface of the electronic device (for example, a keyboard or a touch panel). Therefore, the application of the battery protection system of the present invention does not need to design additional space in the electronic device, and thus the production costs can be saved.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
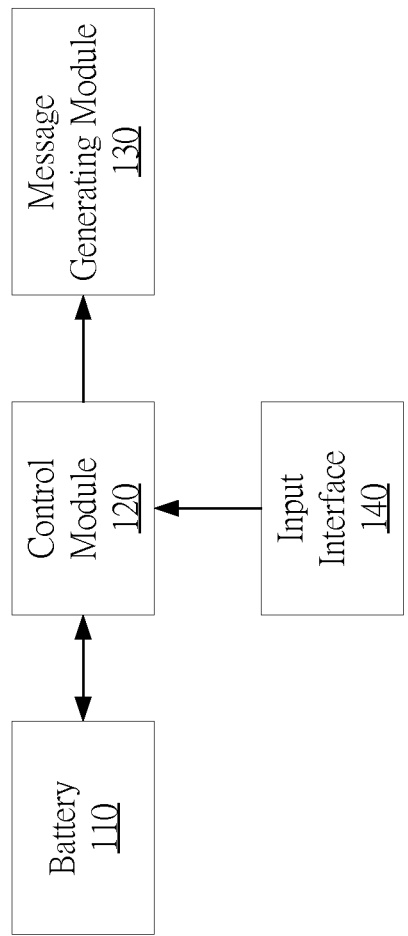
FIG. 1 is a schematic diagram of a battery protection system in accordance with one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Reference is first made to FIG. 1. FIG. 1 is a schematic diagram of a battery protection system 100 in accordance with one embodiment of the present disclosure. The battery protection system 100 includes a battery 110, a control module 120, a message generating module 130 and an input interface 140. In one embodiment of the present disclosure, the battery protection system 100 is applied in, for example but not limited to an electronic device such as a laptop or a handheld device (e.g., a smart phone or a tablet computer). The battery protection system 100 can inform a user when the battery 110 is in an abnormal state, and can release the abnormal state of the battery 110 according to a user command.

The control module 120 is electrically connected to the battery 110. The control module 120 is configured for detecting if the battery 110 is in an abnormal state. In one embodiment of the present disclosure, the battery 110 is a rechargeable battery, and the abovementioned abnormal state includes an over-charge protection state, an over-discharge protection state, a pre-charge failure state, a battery under voltage state, a protection state of battery over-high charging temperature or a protection state of battery over-high discharging temperature.

In one embodiment of the present disclosure, the over-charge protection state includes but not limited to that when the battery is being charged, the charging voltage or the charging current exceeds a threshold value, and, for avoiding the danger caused by over-charging the battery, a protection circuit of the battery controls the battery to be in the over-charge protection state so as to not allow the battery to continue to be charged. The over-discharge protection state includes but not limited to that, when the battery is discharging, the discharging voltage or the discharging current exceeds a threshold value, and, for preventing the battery from being damaged by over-discharging the battery, a protection circuit of the battery controls the battery to be in the over-discharge protection state so as to not allow the battery to continue to discharge.

The message generating module 130 is electrically connected to the control module 120. The message generating module 130 is configured for generating a battery-error warning message when the battery 110 is detected to be in the abnormal state by the control module 120. In one embodiment of the present disclosure, the control module 120 is a chip in the electronic device, and the electronic device includes memory and one or more processors. The message generating module 130 is stored in the memory and configured to be executed by the one or more processors.

In another embodiment of the present disclosure, the electronic device is a laptop running on a Windows operating system, the control module 120 is an embedded controller of the laptop, and the message generating module 130 is an application of the Windows operating system. When the control module 120 detects that the battery 110 is in an abnormal state, the control module 120 informs the message generating module 130 through windows management instrumentation (WMI) such that the message generating module 130 generates a battery-error warning message to inform the user.

The input interface 140 is electrically connected to the control module 120. The input interface 140 is configured for transmitting a user command to the control module 120 such that the control module 120 releases the abnormal state of the battery 110 according to the user command after the battery-error warning message is generated.

In one embodiment of the present disclosure, the electronic device is a computer, the input interface 140 is a keyboard, and the abovementioned user command is generated by pressing a button (e.g., F8) or a combination of buttons (e.g., ALT+CTRL+F8) on the keyboard. In another embodiment of the present disclosure, the electronic device is a smart phone, the input interface 140 is a button of the smart phone, and the abovementioned user command is generated by pressing the button.

In another embodiment of the present disclosure, the message generating module 130 is further configured for generating a battery state message when the control module 120 receives the user command. The abovementioned battery state message can include battery capacity information, battery temperature information or battery health status information.

Figure 2:
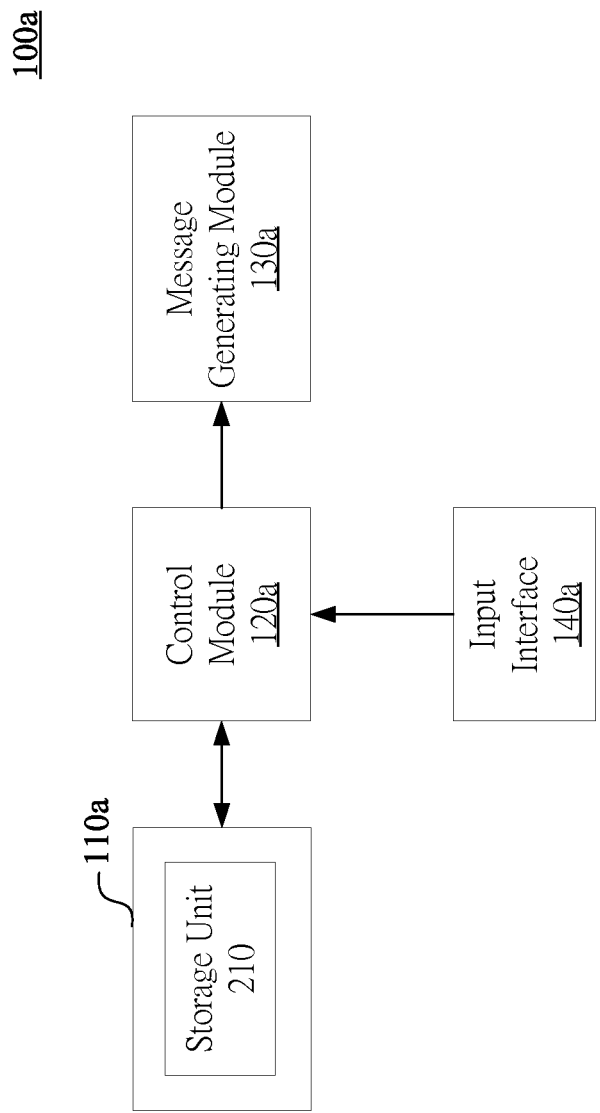
FIG. 2 is a schematic diagram of a battery protection system in accordance with one embodiment of the present disclosure.

Reference is also made to FIG. 2. FIG. 2 is a schematic diagram of a battery protection system 100a in accordance with one embodiment of the present disclosure. Compared with the battery protection system 100 illustrated in FIG. 1, the battery 110a in the battery protection system 100a further includes a storage unit 210.

The functions and operations of the control module 120a, the message generating module 130a and the input interface 140a are similar to the functions and operations of the control module 120, the message generating module 130 and the input interface 140, respectively, and thus are not described again herein.

The storage unit 210 of the battery 110a is configured for storing battery state data, and the control module 120a is further configured for determining whether the battery is in an abnormal state according to the battery state data.

In one embodiment of the present disclosure, the battery state data is a 16-digits value, and a specified 4-digits value of the 16-digits value is used for representing the battery state. Table 1 shows the corresponding battery states represented by the abovementioned 4-digits value.

TABLE 1

| specified 4-digits value of the battery state data | | | | corresponding battery state |
|---|---|---|---|---|
| 0 | 0 | 0 | 0 | normal |
| 0 | 0 | 0 | 1 | pre-charge failure |
| 0 | 0 | 1 | 0 | battery under voltage |
| 0 | 1 | 0 | 0 | over-discharge protection |
| 0 | 1 | 0 | 1 | over-charge protection |
| 1 | 1 | 0 | 1 | battery over-high charging temperature protection |
| 1 | 1 | 1 | 0 | battery over-high discharging temperature protection |

In another embodiment of the present disclosure, the control module 120a is configured for reading the specified 4-digits value of the battery state data stored in the storage unit 210 of the battery 110a as illustrated in Table 1 through a system management bus (SMBus), so as to determine whether the battery 110a is in an abnormal state. For example, when the specified 4-digits value of the battery state data read by the control module 120a is 0100, the control module 120a determines that the battery 110a is in the over-discharge protection state. In another example, when the specified 4-digits value of the battery state data read by the control module 120a is 0101, the control module 120a determines that the battery 110a is in the over-charge protection state.

In the present embodiment, when the control module 120a detects that the battery 110a is in the over-discharge protection state, the control module 120a changes the specified 4-digits value of the battery state data from 0100 to 0000 through the system management bus according to the user command, so as to release the over-discharge protection state of the battery 110a. Subsequently, the control module 120a controls the battery 110a to discharge the electronic device according to the user command. Moreover, when the control module 120a detects that the battery 110a is in the over-charge protection state, the control module 120a changes the specified 4-digits value of the battery state data from 0101 to 0000 through the system management bus according to the user command, so as to release the over-charge protection state of the battery 110a. Subsequently, the control module 120a controls the electronic device to charge the battery 110a according to the user command. In one embodiment of the present disclosure, the control module 120a controls the electronic device to charge the battery 110a and controls the battery 110a to discharge the electronic device through an advanced configuration and power interface (ACPI).

In another embodiment of the present disclosure, the electronic device is a laptop, and the message generating module 130a is further configured for using the battery-error warning message to remind the user to deactivate some of the applications running on the laptop, and to utilize the input interface 140a to generate the user command. For example, when the control module 120a detects that the battery 110a is in the over-discharge protection state, the message generating module 130a generates and uses the battery-error warning message to remind the user to close some of the applications running on the laptop, and to utilize the input interface 140a (e.g., a keyboard) to generate the user command. In the present embodiment, by closing some of the applications running on the laptop, the power supply required by the laptop decreases and thus the discharging current of the battery 110a drops accordingly. At this time, the control module 120a releases the over-discharge protection state of the battery 110a according to the user command, and controls the battery 110a to discharge the laptop.

Figure 3:
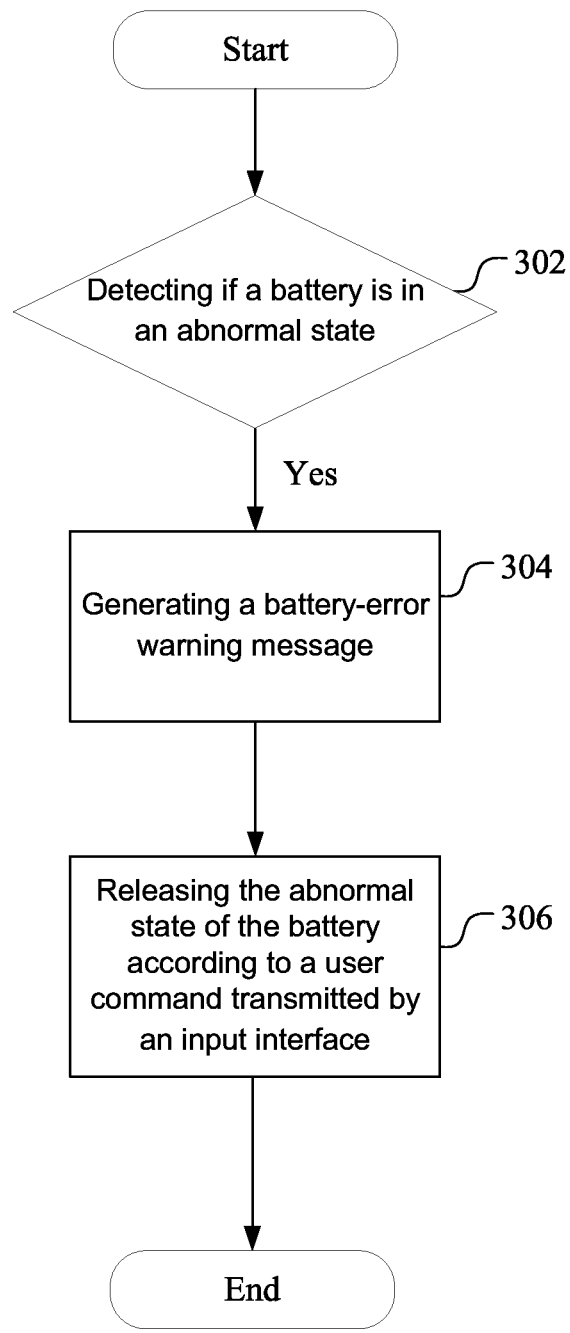
FIG. 3 is a flow chart of a battery protection method in accordance with one embodiment of the present disclosure.

Additional reference is made to FIG. 3. FIG. 3 is a flow chart of a battery protection method in accordance with one embodiment of the present disclosure. The battery protection method may be implemented by the battery protection system 100 or 100a illustrated in FIG. 1 and FIG. 2, but is not limited in this regard. For convenience and clarity, it is assumed that the battery protection method is implemented by the battery protection system 100a illustrated in FIG. 2.

In step 302, the control module 120a detects if the battery 110a is in an abnormal state.

If the result of step 302 is yes, in step 304, the message generating module 130a generates a battery-error warning message.

Then, in step 306, the control module 120a releases the abnormal state of the battery 110a according to a user command transmitted by the input interface 140a.

Figure 4:
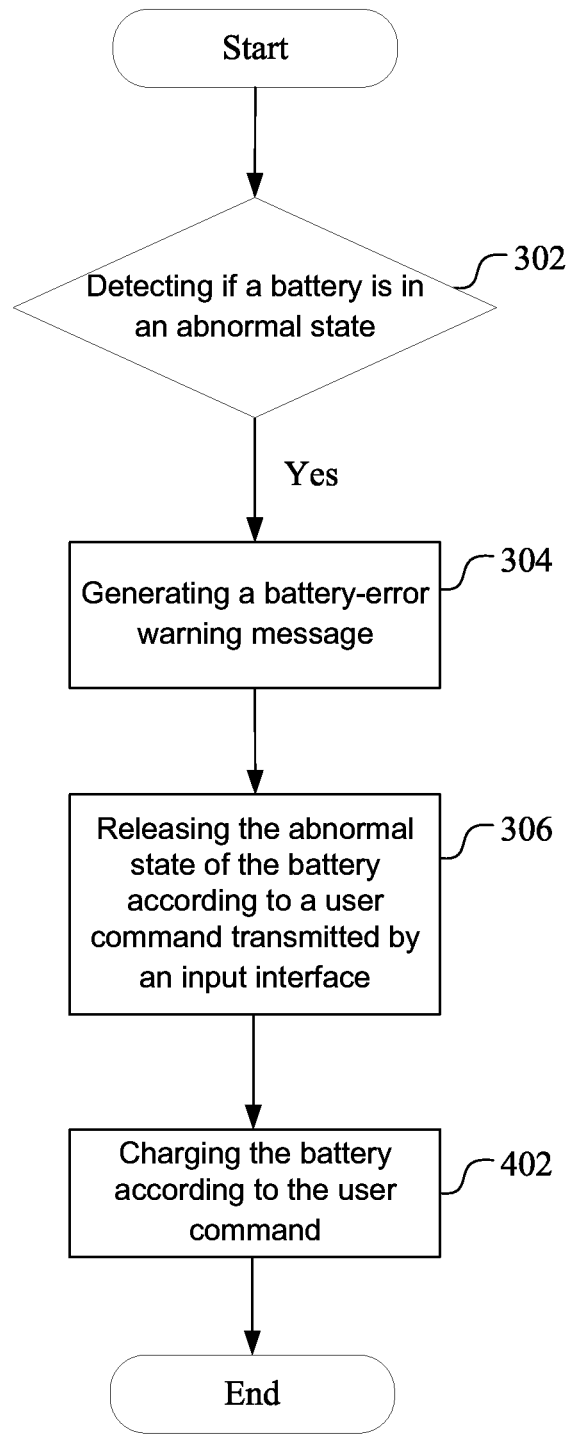
FIG. 4 is a flow chart of a battery protection method in accordance with one embodiment of the present disclosure.

Reference is now made to FIG. 4. FIG. 4 is a flow chart of a battery protection method in accordance with one embodiment of the present disclosure. Compared with the battery protection method illustrated in FIG. 3, the battery protection method illustrated in FIG. 4 further includes step 402. The battery protection method may be implemented by the battery protection system 100 or 100a illustrated in FIG. 1 and FIG. 2, but is not limited in this regard. For convenience and clarity, it is assumed that the battery protection method is implemented by the battery protection system 100a illustrated in FIG. 2.

In the present embodiment, when the battery 110a is detected to be in an over-charge protection state by the control module 120a, in step 402, the control module 120a controls the electronic device to charge the battery 110a according to the user command after releasing the over-charge protection state of the battery 110a.

Figure 5:
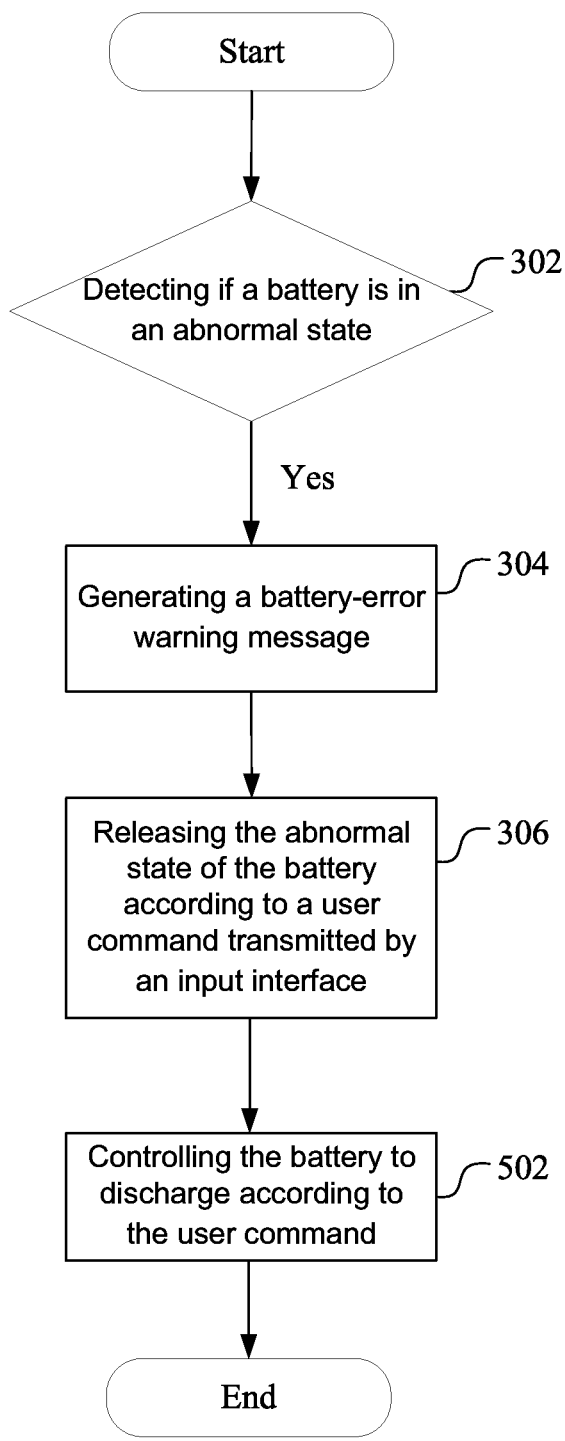
FIG. 5 is a flow chart of a battery protection method in accordance with one embodiment of the present disclosure.

Reference is further made to FIG. 5. FIG. 5 is a flow chart of a battery protection method in accordance with one embodiment of the present disclosure. Compared with the battery protection method illustrated in FIG. 3, the battery protection method illustrated in FIG. 5 further includes step 502. The battery protection method may be implemented by the battery protection system 100 or 100a illustrated in FIG. 1 and FIG. 2, but is not limited in this regard. For convenience and clarity, it is assumed that the battery protection method is implemented by the battery protection system 100a illustrated in FIG. 2.

In the present embodiment, when the battery 110a is detected to be in an over-discharge protection state by the control module 120a, in step 502, the control module 120a controls the battery 110a to discharge the electronic device according to the user command after releasing the over-discharge protection state of the battery 110a.

By applying the techniques disclosed in the present disclosure, the user can release the abnormal states of a battery simply by utilizing an input interface to generate a user command. The user does not need to unplug the battery or the adapter of the electronic device. Furthermore, by detecting the abnormal states of the battery and generating battery-error warning messages to inform the user to perform corresponding operations, the factors invoking the battery protection can be removed (for example, when the battery of a laptop is detected to be in an over-discharge protection state, the user is reminded to close some of the applications so as to reduce the discharge current of the battery). Consequently, the safety of the battery working on the electronic device is improved. Moreover, the input interface configured for transmitting the user command in the battery protection system disclosed in the present disclosure can be integrated with the original input interface of the electronic device (for example, a keyboard or a touch panel). Therefore, it is not necessary to design additional space on the electronic device and thus the production costs can be saved.

The above illustrations include exemplary operations, but the operations are not necessarily performed in the order shown. Operations may be added, replaced, changed order, and/or eliminated as appropriate, in accordance with the spirit and scope of various embodiments of the present disclosure.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A battery protection system for protecting a battery, applicable to an electronic device, the battery protection system comprising:
   a control module electrically connected to the battery for detecting an abnormal state of the battery, including an over-charge protection state of the battery;
   a message generating module electrically connected to the control module for generating a battery-error warning message when the control module detects that the battery is in the abnormal state; and
   an input interface electrically connected to the control module for transmitting a user command to the control module after the battery-error warning message is generated, thereby enabling the control module to release the abnormal state of the battery according to the user command,
   wherein the control module is further configured for controlling the electronic device so that when the control module detects that the battery is in the over-charge protection state, the electronic device charges the battery according to the user command after the control module releases said over-charge protection state of the battery.

2. The battery protection system of claim 1, wherein the control module is further configured for controlling the battery when the control module detects that the battery is in an over-discharge protection state, to discharge the electronic device according to the user command after the control module releases the over-discharge protection state of the battery.

3. The battery protection system of claim 1, wherein the battery comprises a storage unit configured for storing battery state data, and the control module is further configured for determining if the battery is in the abnormal state according to the battery state data.

4. The battery protection system of claim 3, wherein the control module is further configured for changing the battery state data according to the user command, so as to release the abnormal state of the battery.

5. The battery protection system of claim 1, wherein the message generating module is further configured for reminding a user to utilize the input interface to generate the user command according to the battery-error warning message.

6. The battery protection system of claim 1, wherein the message generating module is further configured for reminding a user to deactivate some of programs running on the electronic device according to the battery-error warning message.

7. The battery protection system of claim 1, wherein the message generating module is further configured for generating a battery state message when the control module receives the user command.

8. The battery protection system of claim 1, wherein the control module detects if the battery is in the abnormal state through a system management bus (SMBus), and releases the abnormal state of the battery through the system management bus.

9. The battery protection system of claim 1, wherein the input interface is a keyboard, and the user command is generated by using at least one button on the keyboard.

10. A battery protection method comprising:
    detecting if a battery is in an abnormal state including detecting if the battery is in an over-charge protection state;
    generating a battery-error warning message when the battery is detected to be in the abnormal state; and
    after the battery-error warning message being generated, releasing the abnormal state of the battery according to a user command transmitted by an input interface,
    wherein when the battery is detected to be in the over-charge protection state, charging the battery according to the user command after releasing said over-charge protection state.

11. The battery protection method of claim 10, further comprising:
    when the battery is detected to be in an over-discharge protection state, controlling the battery to discharge according to the user command after releasing the over-discharge protection state of the battery.

12. The battery protection method of claim 10, wherein the operation of detecting if the battery is in the abnormal state further comprises:
    determining whether the battery is in the abnormal state according to battery state data.

13. The battery protection method of claim 12, wherein the operation of releasing the abnormal state of the battery according to the user command transmitted by the input interface further comprises:
    changing the battery state data according to the user command to release the abnormal state of the battery.

* * * * *